UNITED STATES PATENT OFFICE.

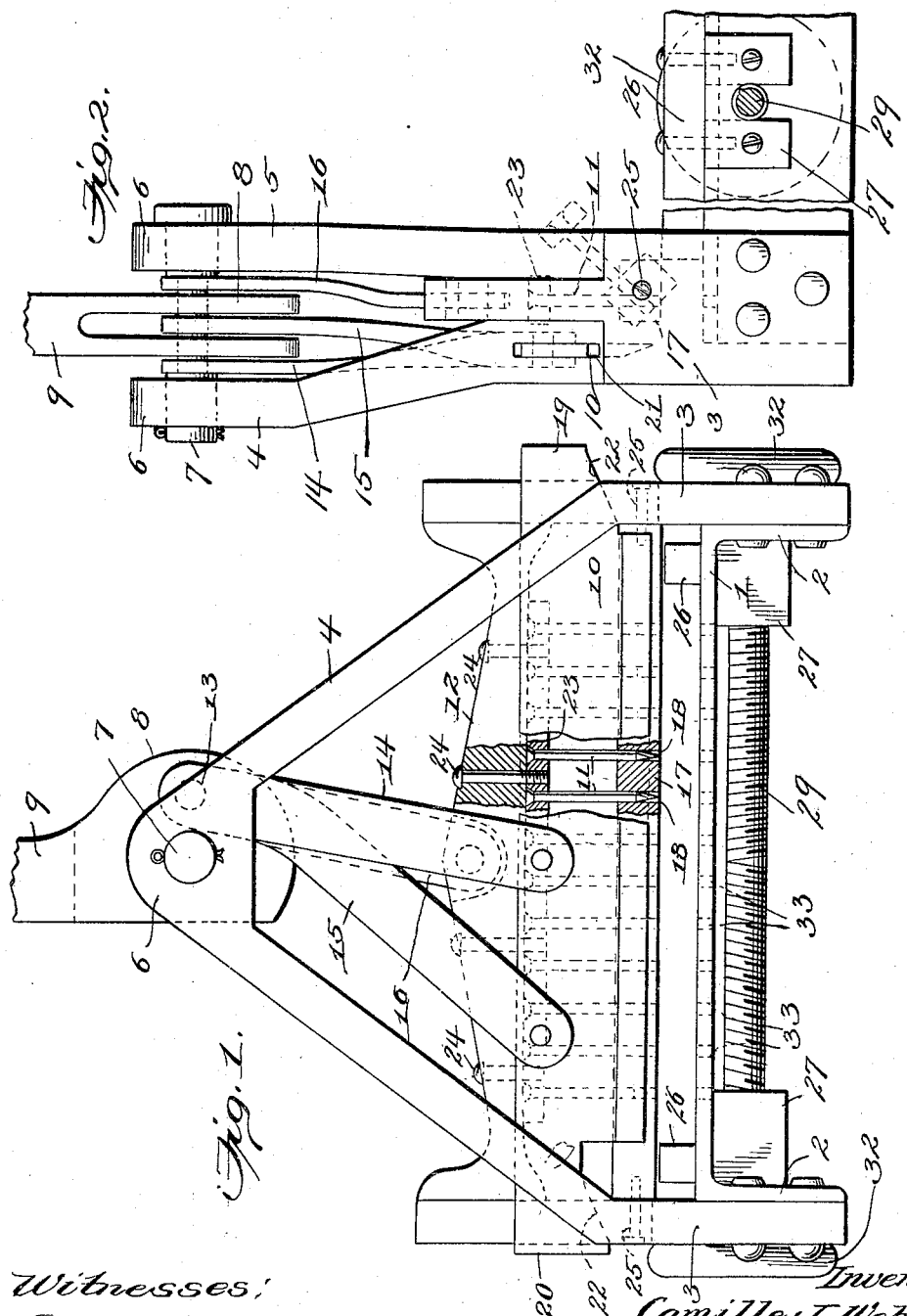

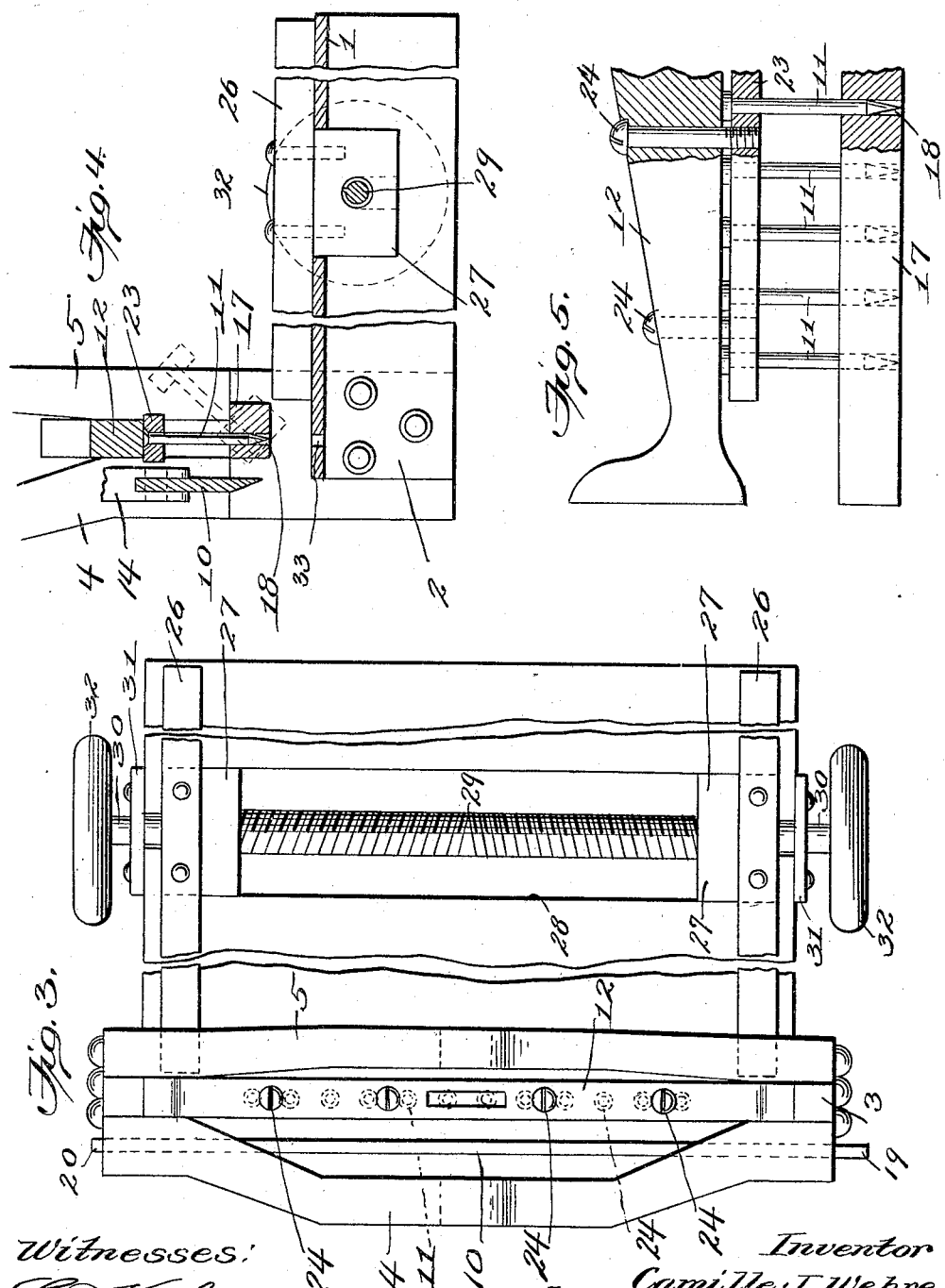

CAMILLE J. WEBRE, OF NEW ORLEANS, LOUISIANA.

IMPLEMENT FOR CUTTING BELTS AND PUNCHING THEIR ENDS.

1,211,987.   Specification of Letters Patent.   Patented Jan. 9, 1917.

Application filed April 10, 1916. Serial No. 90,152.

*To all whom it may concern:*

Be it known that I, CAMILLE J. WEBRE, a citizen of the United States of America, residing at New Orleans, in the parish of Orleans and State of Louisiana, have invented certain new and useful Improvements in Implements for Cutting Belts and Punching Their Ends, of which the following is a specification.

This invention relates to improvements in implements for cutting belts and punching or piercing their ends, proposing an implement of that general type wherein the belts are cut by a transverse knife and holes for the lacing by which adjacent belt ends are bound together are punched or pierced by pins arranged in a transverse row behind the knife.

The objects of the invention, briefly stated, are to provide an implement of the type set forth which shall be true, certain and efficient in its work; which shall be operated with great ease and facility; and which shall be of exceedingly simple structural character.

The invention consists in certain features of structure and organization which, together with the above and other objects and advantages, will be fully set forth as the description proceeds.

An embodiment of the invention is illustrated in the accompanying drawings, in which:—

Figure 1 is a front elevation partly in section of an implement in which the features of the invention are incorporated; Fig. 2 is a side elevation thereof; Fig. 3 is a top plan view thereof; Fig. 4 is a central longitudinal sectional view thereof; and Fig. 5 is a detail front elevation, partly in section, illustrating a slight modification in the organization of the pins which pierce the belt to form the holes for the lacing.

Similar characters of reference designate corresponding parts throughout the several views.

The belt length to be cut and punched is supported during the operation of the machine on a horizontal table 1 which is preferably formed of a section of channel iron and has at its sides depending supporting flanges 2. The operating parts are supported at the front end of the implement by a suitable frame having at its sides upright posts 3 which are secured by rivets or otherwise to the flanges 2. The posts 3 are rigidly connected to or formed in one with front and rear arches 4 and 5 disposed in transverse planes. The arches 4 and 5 have their centers formed as or provided with bearings 6 for a shaft 7 which is disposed in the longitudinal plane of the machine and upon which is mounted the eccentric 8 by which the operation of the working parts is produced, the said eccentric being provided with a suitable operating handle or lever 9. The working parts are a transverse knife 10 and a transverse row of pins 11 disposed in the rear of the knife and preferably having their lower ends pointed. The pins 11 are operated by and movable with a cross-head 12 and said cross-head and the knife 10 both derive their movements from the eccentric 8. For this purpose, the eccentric 8 is provided with a pin 13 parallel to the shaft 7, and said pin is connected to the knife 10 by links 14 and 15 and to the cross-head 12 by a link 16. The cross-head 12 has vertical movement only and is guided in such movement by the posts 3 and by the arches 4 and 5. The posts 3 support a transverse bar 17 having openings 18 through which the pins 11 work. The knife 10, in the course of its vertical movement, is given a transverse horizontal movement whereby said knife will exercise a draw-cut upon the lever. To provide for the transverse horizontal movement of the knife 10, the link 14 is connected to the knife at the center thereof and the link 15, which is of greater length than the link 14, is connected to the knife between the center and that end thereof which is advanced laterally as the knife moves downward; and the knife is provided with end bearers 19 and 20 which extend through slots 21 in the side bars of the arch 4 and have their lower edges 22 which engage the bases of said slots inclined downwardly and laterally in the direction in which the knife is advanced horizontally as it is moved downwardly.

The pins 11 are fitted through openings in a carrier bar 23 which is connected by screws 24 to the cross-head 12. In Fig. 1 the heads of the pins 11 are arranged in countersunk openings on the upper face of the bar 23, while in Fig. 5 the said heads engage between the upper face of the bar 23 and the cross-bar 12, no countersunk openings being provided therefor. In other respects, the construction shown in Fig. 5 is similar to the construction shown in Fig. 1.

The bar 17 is provided at its ends with screws 25 which form journals therefor and are threaded through the posts 3. Obviously, by tightening the screws 25, the bar 17 will be held against turning movement and by loosening said screws the bar 17 may be turned with relation to said screws as a pivotal axis. This arrangement is adopted to facilitate the renewal of the pins 11 or the substitution of pins of one diameter for pins of another. To effect such renewal or substitution, the screws 24 are first taken out whereby the bar 23 will be free of the crosshead 12 and the screws 25, being suitably backed off, the bar 17 is turned into the dotted line position of Fig. 2, carrying with it the pins 11 and the bar 23. Obviously, the pins 11 may be then removed and other pins may be substituted, after which the bar 17 and therewith the pins 11 and the bar 23 are restored to their normal operative relation, the bar 23 being then connected by the screws 24 to the cross-head 12 and the screws 25 being tightened.

The belt length is accurately positioned and securely held against movement on the table 1 by clamp bars 26 which are arranged in parallel relation adjacent the sides of the table and are each provided with a block 27 fitted in a transverse slot 28 formed in the table and having its upper face flush with the upper face of the table. The blocks 27 are formed as nuts for coöperation with an adjusting screw 29 which is right- and left-threaded from its center, i. e. the threads at one side of its center are right threads and the threads at the other side of its center are left threads. The screw 29 is provided with end trunnions or journals 30 having their bearings in the flanges 2 and in plates 31 secured to said flanges, and the said trunnions each carry a hand-wheel 32 by means of which the screw 29 may be turned to adjust the clamp bars 26 toward or away from one another. The knife 10 is disposed in a plane just beyond the front edge of the table 1 and co-acts with said front edge in cutting the belt. The table 1 is provided slightly in the rear of its front edge with a transverse row of openings 33 through which the pins 11 pass in their operation. The lower ends of the pins 11 are at such an elevation relatively to the cutting edge of the knife 10 that said pins will engage the belt before the knife 10. An advantage is thereby secured in that the pins positively hold the belt at regular intervals along its width prior to and throughout the cutting operation with the result that the belt will be evenly and truly cut square and that its edge, produced by the cutting operation, will bear an exact and accurate relation to the row of holes produced by the pins 11. An advantage is secured by having the lower ends of the pins 11 pointed in that the belt is not punched, in the strict sense of the word, as ordinarily, but is pierced and its fiber is not cut. The clamp bars 26 serve to accurately center the belt with relation to the pins 11, and since said bars may be simultaneously and uniformly adjusted toward and from one another by an operation of the screw 29, they may be adapted for belts of different widths within the capacity of the machine.

In use, the knife 10 and the pins 11 are first raised as far as possible and thereupon the belt is placed in position upon the table and secured by the clamp bars 26 which, of course, terminate in the rear of the pins 11. A portion of the belt will project beyond the bars 26 and under the bar 17 and this projecting portion will be formed as a belt end for connection by a lacing to a similarly formed belt end, by the action of the knife 10 and the pins 11. The operation of the knife 10 and the pins 11 is obviously produced by a downward movement of the lever 9 from its upright position, shown in Fig. 1, this causing the knife and the pins to descend. As above stated, the pins engage the belt prior to the cutting operation of the knife and the knife in the course of its downward movement is also moved horizontally in the direction of its length whereby to produce a draw-cut. When the pins 11 are in their uppermost positions, their pointed lower ends will be within the openings 18 of the bar 17 and the said bar will thus protect the points of the pins from being blunted and will protect the pins themselves against distortion or breakage which might otherwise occur in case the pointed ends of the pins were free to catch against objects or obstructions.

It is obvious that the present implement provides for the lacing of a belt, with its ends in contact with each other and in positions of perfect coincidence, thereby resulting in an endless belt whose alinement is true and exact and which has not been weakened by any material having been cut out as is usually the case in punching out lacing holes.

The present implement will pierce an opening of only sufficient size to accommodate a metallic lace. This results in a much stronger joint and one which presents to the surface of the pulley a smooth or continuous surface, which avoids the pounding that frequently occurs when the joined ends of the belt pass over a pulley. Another advantage obtained by the close and even jointure of the belt ends is that air cannot enter between the plies of the belt with consequent injury to the belt structure and it is not necessary to employ the hinged or equivalent connection ordinarily used with metallic lacing.

I claim—

1. In an implement of the type set forth, in combination, a table, a transverse knife, an eccentric supported above the knife, a pair of links connecting the eccentric and the knife, one link being connected to the center of the knife and the other link, longer than the first one, being connected to the knife between the center and an end thereof, end bearers carried by the knife and having inclined guide faces and posts at each side of the knife having slots through which said end bearers project.

2. In an implement of the type set forth, in combination, a table, a transverse knife, a transverse series of perforating pins and means for vertically and simultaneously reciprocating the knife and the pins, the pins having their lower ends arranged at an elevation relatively to the knife edge whereby the pins will engage the material on the table prior to the cutting operation of the knife.

3. In an implement of the type set forth, in combination, a table, a transverse knife, a transverse series of perforating pins, means common to the knife and the pins for effecting a vertical reciprocation thereof and means acting in conjunction with the vertical reciprocation of the knife for simultaneously shifting the knife in the direction of its length.

4. In an implement of the type set forth, in combination, a table, a transverse knife, a transverse series of perforating pins, means common to the knife and the pins for effecting a vertical reciprocation thereof and means acting in conjunction with the vertical reciprocation of the knife for simultaneously shifting the knife in the direction of its length, the pins having their lower ends arranged at an elevation to the knife edge whereby the pins will engage the material on the table prior to the cutting operation of the knife.

5. In an implement of the type set forth, in combination, a table, a transverse knife, a transverse series of perforating pins, an eccentric supported above the knife and the pins, a cross-head carrying the pins, a link connecting the eccentric and the cross-head, a pair of links connecting the eccentric and the knife, one link being connected to the center of the knife and the other link, longer than the first one, being connected to the knife between the center and an end thereof, and inclined guide means for directing the knife in the direction of its length in connection with the vertical reciprocation thereof.

6. In an implement of the type set forth, in combination, a table, a transverse knife, an eccentric supported above the knife, a pair of links connecting the eccentric and the knife, one link being connected to the center of the knife, and the other link, longer than the first one, being connected to the knife between the center and an end thereof, and inclined guide means for directing the knife in the direction of its length in connection with the vertical reciprocation thereof.

7. In an implement of the type set forth, in combination, a table, a transverse series of perforating pins, means for vertically reciprocating the pins and a transverse bar arranged above the table and having openings for the pins, the bar having such elevation that the pins, when raised, will have their lower ends housed in said openings.

8. In an implement of the type set forth, in combination, a table, a transverse series of perforating pins, a vertically reciprocatory cross-head, a bar detachably secured against the under side of the cross-head and by which the pins are held, a transverse bar arranged above the table and having openings for said pins, and end journals forming axes about which said last-named bar may be turned.

9. In an implement of the type set forth, in combination, a table, a frame at the front end thereof comprising upright posts at the side of the table and front and rear arches connecting said posts, said arches having bearings at their centers, a cross-head slidable between the posts and the arches, perforating pins carried by the cross-head, a transverse knife arranged in front of the perforating pins, the front arch having guide means for the knife, a shaft journaled in said bearings, an eccentric mounted on said shaft between said arches, and links connecting said eccentric respectively to said cross-head and said knife.

10. In an implement of the type set forth, in combination, a table, transversely reciprocating belt end forming means at the front thereof, parallel clamp bars adjacent the sides of the table and terminating in the rear of the means, and means for adjusting the clamp bars toward and away from one another.

In testimony whereof I have hereunto set my hand in presence of two subscribing witnesses.

CAMILLE J. WEBRE.

Witnesses:
JOHN RIDGLEY,
JOHN M. O'NEILL.

Copies of this patent may be obtained for five cents each, by addressing the "Commissioner of Patents, Washington, D. C."